(12) United States Patent
Weber

(10) Patent No.: US 7,080,294 B1
(45) Date of Patent: Jul. 18, 2006

(54) THRESHOLD CROSSING ALARM SYSTEM

(75) Inventor: Walt Weber, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 557 days.

(21) Appl. No.: 10/143,704

(22) Filed: May 10, 2002

(51) Int. Cl.
*G06F 11/00* (2006.01)

(52) U.S. Cl. .................................... 714/704

(58) Field of Classification Search ............... 714/704, 714/746, 758; 370/335
See application file for complete search history.

(56) References Cited

U.S. PATENT DOCUMENTS

| | | | | |
|---|---|---|---|---|
| 5,271,011 A | * | 12/1993 | McMullan et al. | 714/807 |
| 5,331,642 A | * | 7/1994 | Valley et al. | 714/705 |
| 5,606,563 A | * | 2/1997 | Dorbolo et al. | 714/704 |

* cited by examiner

*Primary Examiner*—Albert Decady
*Assistant Examiner*—James C Kerveros

(57) ABSTRACT

A method for activating an alarm based on a series of error counts generated by a monitoring device, including an integrator, an accumulator, and an alarm. The integrator adjusts the error count and produces an adjusted count, which it then sends to the accumulator. The accumulator keeps a running total of the adjusted counts and can activate the alarm when the running total exceeds a predetermined alarm level. The adjustment of the error count by the integrator is accomplished by a set of formulas that use a set of variables. The values for these variables can be derived through a series of calculations or can be chosen by a user. The ability to adjust the error counts allows the user to better control the circumstances that cause activation of an alarm.

51 Claims, 2 Drawing Sheets

THRESHOLD CROSSING ALARM SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to threshold crossing alarms and more specifically to a method and system for activating an alarm based on a series of error counts gathered by a performance monitoring system.

BACKGROUND OF THE INVENTION

Individual components within systems in which high-speed data transfer occurs, such as computer networks and telecommunications systems, can be equipped with monitoring devices to audit the quality of the data transmissions. The monitoring devices typically count the number of errors that occur over a particular sampling interval and report the count at the end of the interval. The monitoring devices may also have the capability to activate an alarm when the number of errors exceeds a user-defined threshold. These alarms are called threshold crossing alarms. A monitoring device without the ability to activate a threshold crossing alarm can report the error count to a system that does have threshold crossing alarm capability.

Two general types of error events can be defined: dribble and burst. A dribble refers to a relatively low number of errors occurring over a relatively long period of time. A burst refers to a relatively large number of errors occurring over a relatively short period of time. Since some number of errors tends to occur even in a properly operating component, a dribble that occurs over a short period is not necessarily indicative of a problem. Similarly, a few random or low-level bursts do not necessarily indicate a problem. As a result, users of threshold crossing alarms may experience difficulty in setting the alarm threshold at a level that accurately indicates a legitimate problem in a component being monitored. If the alarm level is set high so that only significant bursts activate the alarm, a steady dribble of errors indicating an actual problem could go unnoticed. On the other hand, if the alarm level is set low so that dribbles activate the alarm, an excessive number of alarms could occur from non-significant bursts or increased dribbles. These false alarms may cause technicians monitoring the alarms to begin discounting or ignoring the alarms. As a result, when an alarm indicates an actual problem, the problem could again go unnoticed.

SUMMARY OF THE INVENTION

The present invention discloses a method and system for activating an alarm based on a series of error counts generated by a monitoring device. When two components in a computer network, telecommunications system, or other system transfer data between themselves, a monitoring device can monitor the data transmission and report the number of data errors that occur over a sampling interval. The error count produced by a monitoring device can be received by the present invention, which in one embodiment may comprise an integrator, an accumulator, and an alarm. The integrator adjusts the error count and produces an adjusted count, which it then sends to the accumulator. The accumulator keeps a running total of the adjusted counts and can activate the alarm when the running total exceeds a user-defined alarm level. The adjustment of the error count by the integrator is accomplished by a set of formulas that use a set of variables whose values can be derived through a series of calculations or can be chosen by users of the system. The ability to adjust the error counts allows users to control the circumstances that cause activation of an alarm.

DETAILED DESCRIPTION OF THE PREFERRED EMBODIMENTS

An embodiment of the Threshold Crossing Alarm System of the present invention generally allows users to customize the circumstances that activate an alarm based on the error counts generated by a monitoring device. The raw error count produced by a monitoring device, i.e., the actual number of errors that occurred in a sampling interval, does not directly activate an alarm. Instead, the Threshold Crossing Alarm System creates an adjusted count by assigning a value to each raw error count. Low raw error counts are generally assigned low adjusted counts and high raw error counts are generally assigned high adjusted counts. The Threshold Crossing Alarm System keeps a running total of the adjusted counts and can activate an alarm based on the running total.

The adjusted counts can be viewed as points along a scale that acts as a surrogate for the scale along which raw error counts lie. Raw error counts can lie anywhere on a scale from zero up to the data transmission rate of the components being monitored. This scale can be very large and does not necessarily reflect the significance of a raw error count. For example, if two raw error counts are both large enough to be considered bursts but the first count is twice as large as the second, the first is not necessarily twice as significant as the second. For threshold alarm purposes, any two bursts may be deemed generally equivalent. Adjusted counts, on the other hand, can be placed on an adjusted count scale that can be defined in a manner that more accurately reflects the significance of a raw error count. For example, all raw error counts that are large enough to be considered bursts can be placed at the highest point on the adjusted count scale. The ability to assign values to raw error counts different from the error counts themselves and to place the assigned values on a user-defined scale allows users of the Threshold Crossing Alarm System to manipulate the behavior of the system by controlling the size and number of error counts that activate an alarm. Users can specify the size and number of dribbles, the size and number of bursts, and the combinations of dribbles and bursts that cause alarm activation. The use of a running total of adjusted counts rather than a single raw error count as the basis for alarm activation extends the time over which error counts may be evaluated. This can prevent a single burst from activating an alarm and generally enhances the performance of the error alarm system.

Figure 1:
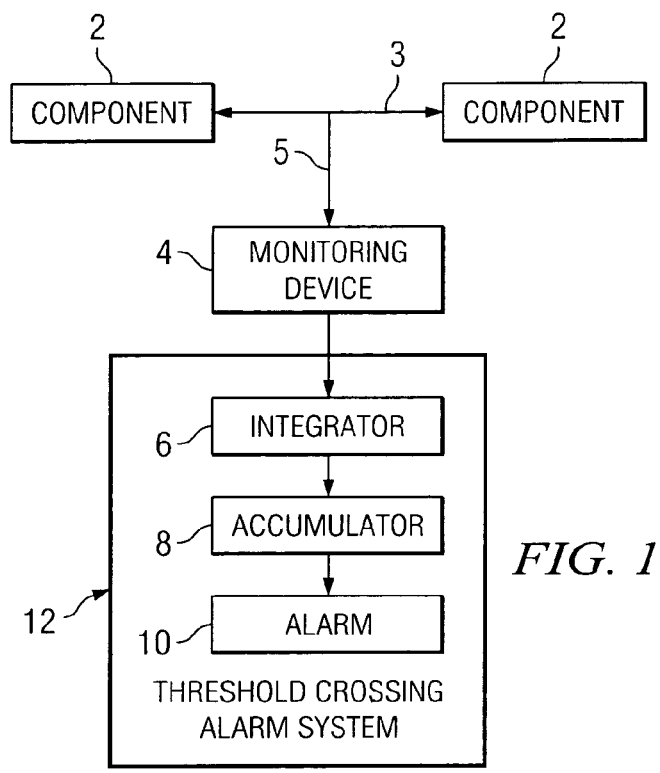
FIG. 1 is a block diagram showing the monitoring of data transmissions by an embodiment of the Threshold Crossing Alarm System of the present invention.

The monitoring by a Threshold Crossing Alarm System of data transmissions between two components of a computer network, telecommunications system, or similar system is depicted in FIG. 1. Components 2 transfer data between themselves via connection 3. A monitoring device 4 monitors data transfer via connection 5. While FIG. 1 shows a single monitoring device external to the components and monitoring data transmissions on the connection between the components, other configurations are possible. For example, a monitoring device could be built in to either or both of the components and receive an error count directly from a component. In this case, a threshold crossing alarm could also be built in to the components or could be external to the components. Also, rather than monitoring the line between the components, an external monitoring device could receive error counts directly from a component. Since it is the output of an error count from a monitoring device or devices rather than the method of input of error information into the device or devices that is of primary concern to the Threshold Crossing Alarm System, all configurations of components and monitoring devices will be considered equivalent for purposes of this specification.

At the end of each sampling interval, the monitoring device 4 sends an error count to a Threshold Crossing Alarm System 12. The Threshold Crossing Alarm System 12 comprises an integrator 6, an accumulator 8, and an alarm 10. While the integrator 6, the accumulator 8, and the alarm 10 are depicted in FIG. 1 as separate functional components, a combination of the integrator 6 and the accumulator 8 or a combination of the integrator 6, the accumulator 8, and the alarm 10 could be implemented as a single physical component. The integrator 6 accepts a raw error count from the monitoring device 4, manipulates the raw error count to derive an adjusted count, and sends the adjusted count to the accumulator 8. The accumulator 8 receives adjusted counts from the integrator 6 and keeps a running total of the adjusted counts. When the total of adjusted counts in the accumulator 8 reaches an Alarm Level, alarm 10 is activated. Users of a Threshold Crossing Alarm System can adjust the Alarm Level, the size of the adjusted counts, and other variables used by the integrator to fine-tune the system so that an alarm accurately indicates a significant problem in a component being monitored by a monitoring device.

A raw error count that can be referred to as the Dribble Level can be specified by users of the Threshold Crossing Alarm System. When the raw error count is at or above the Dribble Level, an adjusted count is added to the accumulator and when the raw error count is below the Dribble Level, an adjusted count is subtracted from the accumulator. The addition of an adjusted count to the accumulator can be referred to as an Up Count and the subtraction of an adjusted count from the accumulator can be referred to as a Down Count. An Up Count or a Down Count occurs at the end of each sampling interval. Raw error counts just above the Dribble Level cause small Up Counts while raw error counts much greater than the Dribble Level cause large Up Counts. Similarly, raw error counts just below the Dribble Level cause small Down Counts while raw error counts near zero cause large Down Counts. If Up Counts of a sufficient size and/or number occur, the Alarm Level can be reached. On the other hand, Down Counts tend to prevent the Alarm Level from being reached.

An appropriate Dribble Level can be derived from the Line Rate and Sampling Interval parameters of a monitoring device and from a user-defined acceptable Error Rate. Components being monitored by a monitoring device typically operate at a particular data transmission rate or Line Rate. This is the number of data bits that are transmitted per second, often measured in megabits per second. Many monitoring devices use a Sampling Interval of 15 minutes or 900 seconds. That is, the number of errors in a 15-minute interval is counted and then reported at the end of the interval. Users of the Threshold Crossing Alarm System can choose an Error Rate, the number of errors per second that is acceptable or the acceptable proportion of error bits to total bits. The Line Rate, Sampling Interval, and Error Rate can be used to derive the Dribble Level, i.e., the lowest raw error count that can cause an Up Count in the accumulator. In one embodiment, the Dribble Level can be defined to be the Line Rate in bits per second multiplied by the Sampling Interval in seconds per interval multiplied by the Error Rate in errors per total bits. For example, if the Line Rate is 5 megabits per second ($5 \times 10^6$), the Sampling Interval is 900 seconds, and the Error Rate that a user considers acceptable is $1 \times 10^{-8}$ (one error bit per hundred million bits), then the Dribble Level can be set at:

$$(5 \times 10^6)*(900)*(1 \times 10^{-8})=45 \text{ errors per Sampling Interval.}$$

Alternatively, users can simply choose a value for the Dribble Level that will cause the Threshold Crossing Alarm System to behave in a desired manner.

The value derived or chosen for the Dribble Level can be used to derive an Alarm Level. Users can choose the total Sampling Period over which the accumulator accepts adjusted counts from the integrator. A typical Sampling Period is eight hours. That is, the accumulator total reflects a running total of the Up Counts and Down Counts received from the integrator over all Sampling Intervals in the previous eight hours. Since one Sampling Interval is typically 15 minutes long, there would typically be 32 Sampling Intervals in one Sampling Period. (Four 15-minute Sampling Intervals per hour multiplied by eight hours per Sampling Period equals 32 Sampling Intervals per Sampling Period.) Alternatively, users can choose a different value for the number of Sampling Intervals per Sampling Period. The Alarm Level can be defined as the Dribble Level multiplied by the number of Sampling Intervals per Sampling Period, which, in this case, is 45*32=1440. Alternatively, users can choose a different value for the Alarm Level.

When the raw error count is exactly equal to the Dribble Level, the Up Count is typically set to be equal to the Dribble Level. By way of example, if the raw error count is exactly equal to the Dribble Level in every Sampling Interval in a Sampling Period, 32 Up Counts of 45 would occur and the Alarm Level of 1440 would just be reached at the end of the Sampling Period. If the raw error count is above the Dribble Level in one or more Sampling Intervals and equal to the Dribble Level in every other Sampling Interval, one or more Up Counts greater than 45 would occur and the Alarm Level would be reached before the end of the Sampling Period. If the raw error count is below the Dribble Level in one or more Sampling Intervals and equal to the Dribble Level in every other Sampling Interval, the Alarm Level would not be reached before the end of the Sampling Period because the raw error counts below the Dribble Level would cause Down Counts and prevent the accumulator from reaching the Alarm Level.

In addition to the Alarm Level being reached by dribbles occurring over a large proportion of the Sampling Period, users may wish to have a small number of consecutive bursts or a larger number of non-consecutive bursts cause an alarm. A Burst Level can be defined as the level at or above which a raw error count is considered a burst and can be any value greater than the Dribble Level. The largest possible Up Count occurs when a burst occurs. Users can set the Burst Level and other variables within the system so that a certain number of consecutive bursts or a certain number of non-consecutive bursts within a certain sampling period will produce Up Counts large enough for the accumulator to reach the Alarm Level. A user may typically choose a Burst Level that is ten times the Dribble Level. Using the example values above, this would give a Burst Level of 10*45=450. The raw error count is typically ranged so that when a raw error count greater than the Burst Level occurs, the Burst Level is used as the raw error count instead of the actual raw error count. For example, if the Burst Level is 450 and a raw error count of 500 occurs, a value of 450 would typically be used as the raw error count. This prevents a single, very large burst from causing the Alarm Level to be reached.

The Consecutive Burst Limit, the number of consecutive bursts that causes an alarm, can be chosen by a user and can be used to calculate the largest Up Count that is ever added to the accumulator. The Maximum Up Count, the maximum adjusted count that can be added to the accumulator or the amount that is added to the accumulator when a burst occurs, can be defined as the Alarm Level divided by the Consecutive Burst Limit. In other words, if the raw error count received by the integrator is equal to or greater than the Burst Level, the Maximum Up Count is added to the accumulator. If the Maximum Up Count is added to the accumulator a number of times equal to the Consecutive Burst Limit, the Alarm Level will be reached even if the accumulator was at zero prior to the bursts occurring. For example, if the Consecutive Burst Limit is chosen to be four, and the Alarm Level is 1440, the Maximum Up Count would be 1440/4=360. If the Burst Level is met or exceeded four times in a row, 360 would be added to the accumulator four times in a row, giving an accumulator total of at least 1440. This would guarantee that the Alarm Level would be reached even if the accumulator was at zero before the four bursts occurred.

Alternatively, users can choose a different value for the Maximum Up Count. For example, if a user were interested not in the number of consecutive bursts but the number of random bursts in the Sampling Period, a Maximum Up Count could be chosen that would cause the accumulator to reach the Alarm Level when the chosen number of bursts occurred in the Sampling Period even if all other Sampling Intervals in the Sampling Period had a raw error count of zero.

When the raw error count is equal to the Dribble Level, the Up Count is typically chosen to be equal to the Dribble Level. Alternatively, users can choose a different Up Count when the raw error count equals the Dribble Level. When the raw error count is equal to or greater than the Burst Level, the Maximum Up Count as derived above or as chosen by a user is typically used as the Up Count. When the raw error count is between the Dribble Level and the Burst Level, the size of the Up Count is correlated to how close the raw error count is to the Dribble Level or the Burst Level. If the raw error count is close to the Dribble Level, the Up Count is close to the Dribble Level. If the raw error count is close to the Burst Level, the Up Count is close to the Maximum Up Count. Since the Up Count is equal to the Dribble Level when the raw error count is equal to the Dribble Level and is greater than the Dribble Level when the raw error count is greater than the Dribble Level, the Up Count can be viewed as the Dribble Level plus a value that is proportional to the amount by which the raw error count exceeds the Dribble Level. This proportional value can be equal to the size of the Up Count scale divided by the size of the raw error count scale. The size of the Up Count scale is equal to the difference between the largest possible Up Count and the smallest possible Up Count, i.e., the Maximum Up Count minus the Dribble Level. For example, if the Maximum Up Count is 360 and Dribble Level is 45, the size of the Up Count scale is 360−45=315. The size of the raw error count scale is equal to the difference between the largest possible raw error count and the smallest possible raw error count that would cause an Up Count, that is, the Burst Level minus the Dribble Level. For example, if the Burst Level is 450 and Dribble Level is 45, the size of the raw error count scale is 450−45=405. When the amount by which a raw error count exceeds the Dribble Level is divided by the size of the raw error count scale, the result is the proportional distance up the raw error count scale at which the raw error count is located. For example, if the raw error count is 100 and the Dribble Level is 45, then the amount by which the raw error count exceeds the Dribble Level is 100−45=55. If the size of the raw error count scale is 405, then a raw error count of 100 is 55/405=13.6% of the distance up the raw error count scale. An amount that is the same proportional distance up the Up Count scale can be added to the Dribble Level to derive the final Up Count. In other words, when the proportional distance of the raw error count up the raw error count scale is multiplied by the size of the Up Count scale, the result is the proportion of the Up Count scale that is to be added to the Dribble Level to find the Up Count. Continuing the previous examples, if the size of the Up Count scale is 315 and the raw error count is 13.6% of the distance up the raw error count scale, the corresponding distance up the Up Count scale is 0.136*315=42.8. Therefore, 42.8 is added to the Dribble Level of 45 to obtain an Up Count of 87.8. In other words, when a raw error count of 100 occurs, 87.8 is added to the accumulator.

The ratio of the size of the Up Count scale to the size of the raw error count scale can be called the Up Factor. That is, the Up Factor, UF, can be defined to be the ratio of the Maximum Up Count minus the Dribble Level to the Burst Level minus the Dribble Level. Mathematically:

$$UF=(\text{Maximum Up Count}-\text{Dribble Level})/(\text{Burst Level}-\text{Dribble Level}).$$

The amount to be added to the accumulator when a raw error count at or above the Dribble Level occurs (the Up Count) can then be expressed as:

$$\text{Up Count}=\text{Dribble Level}+(UF*(\text{count}-\text{Dribble Level})),$$

where "count" means raw error count. It can be seen that when the raw error count equals the Dribble Level, the expression (count−Dribble Level) equals zero, the expression UF*(count−Dribble Level) equals zero, and only the Dribble Level is added to the accumulator. When the raw error count equals the Burst Level, the expression (count−Dribble Level) equals (Burst Level−Dribble Level). When this is multiplied by UF, the result is (Maximum Up Count−Dribble Level). When this is then added to the Dribble Level, the result is the Maximum Up Count, as desired.

When the raw error count is between the Dribble Level and the Burst Level, the Up Count is the Dribble Level plus the Up Factor times the amount by which the raw error count exceeds the Dribble Level. Alternatively, users can simply choose the Up Factor rather than derive it in the process described above.

When the raw error count is less than the Dribble Level, an amount is subtracted from the accumulator; that is, a Down Count occurs. Similar to the case when the raw error count is at or above the Dribble Level, the size of the Down Count correlates to the amount by which the raw error count differs from the Dribble Level. When the raw error count is only one count below the Dribble Level, the Down Count is small. When the raw error count is zero, the maximum amount is subtracted from the accumulator. The Maximum Down Count, the maximum amount that is subtracted from the accumulator, can be calculated from the Alarm Level, the number of Sampling Intervals per Sampling Period, and the Consecutive Burst Limit. If a number of consecutive bursts equal to the Consecutive Burst Limit occurs in a Sampling Period, the accumulator will reach the Alarm Level. The maximum number of non-burst intervals in such a Sampling Period is equal to the number of Sampling Intervals per Sampling Period minus the Consecutive Burst Limit. For example, if the number of Sampling Intervals per Sampling Period is 32, the Consecutive Burst Limit is four, and the Consecutive Burst Limit is reached in the Sampling Period, the maximum number of Sampling Intervals in the Sampling Period in which bursts do not occur is 32−4=28. If raw error counts of zero occur in each of these non-burst Sampling Intervals, an embodiment of the invention would have the accumulator count down from the Alarm Level to zero. Therefore, in this embodiment, the maximum amount by which the accumulator would count down is equal to the Alarm Level divided by the maximum number of Sampling Intervals in the Sampling Period in which bursts do not occur. Using the same example values used previously, the Maximum Down Count would be 1440/28=51.43. That is, if 51.43 is subtracted from the accumulator 28 times, the accumulator will decrease from 1440 to zero. Alternatively, users can simply choose a value for the Maximum Down Count.

Similar to the case with Up Counts, the Down Count is greatest when the raw error count is zero and is lowest when the raw error count is closest to the Dribble Level. The Down Factor, the smallest incremental amount to be subtracted from the accumulator, can be defined to be the Maximum Down Count divided by the size of the Down Count scale. If the Dribble Level is 45, the largest raw error count that can cause a Down Count is 44. The smallest possible raw error count is zero, so the size of the Down Count scale is from 44 to zero, inclusive, or 45. Therefore, the smallest incremental downward step is 51.43/45=1.14. That is, when the raw error count is one less than the Dribble Level, the accumulator decreases by 1.14. As the raw error count decreases farther below the Dribble Level, the accumulator decreases by the Down Factor multiplied by the difference between the Dribble Level and the raw error count. If the Down Factor is symbolized by DF, the formula for the adjusted count for a case when the raw error count is less than the Dribble Level (the Down Count) can be expressed as:

Down Count=$DF$*(Dribble Level−count).

The largest possible raw error count that still remains below the Dribble Level is the Dribble Level minus 1. At this raw error count, the expression (Dribble Level−count) equals 1 and the Down Count equals DF, the Down Factor. When the raw error count is as small as possible (i.e., zero), the expression (Dribble Level−count) equals the Dribble Level and the Down Count is the Down Factor times the Dribble Level. This is equal to the Maximum Down Count, as desired. When the raw error count is between the Dribble Level and zero, the Down Count is the Down Factor times the difference between the Dribble Level and the raw error count. For example, if the raw error count is 20 and all other variables are as described above, the Down Count is 1.14*(45−20)=28.5. That is, 28.5 would be subtracted from the accumulator. Alternatively, users can simply choose the Down Factor rather than derive it in the process described above.

The formulas given above for the Up Count and the Down Count can be used to calculate the running total for the accumulator. Specifically, when an Up Count occurs, the new accumulator total can be expressed as:

new accumulator total=old accumulator total+Up Count.

Similarly, the new accumulator total for a Down Count can be expressed as:

new accumulator total=old accumulator total−Down Count.

These can be expanded to the following:

new total=old total+Dribble Level+($UF$*(count−Dribble Level))

and new total=old total−($DF$*(Dribble Level−count))

and then rearranged to the following:

new total=old total+($UF$*(count−Dribble Level))+Dribble Level new total=old total+($DF$*(count−Dribble Level)).

When expressed this way the two formulas can be seen to be identical except for the two different proportioning factors, UF and DF, and the addition of the Dribble Level in Up Count formula. The two expressions (($UF$*(count−Dribble Level))+Dribble Level) and ($DF$*(count−Dribble Level)) comprise the actions taken by the integrator in the embodiment shown in FIG. 1. Therefore, the function of the integrator can be described in general as taking the difference between the raw error count and the Dribble Level, multiplying this difference by a proportioning factor, and then adding to this product an offset term. In the case of an Up Count, the offset term is typically the Dribble Level. In the case of a Down Count, the offset term is typically zero.

In an embodiment of the invention, users of the Threshold Crossing Alarm System can use values for the variables that are different from those derived above. The raw error count is typically ranged so that when a raw error count greater than the Burst Level occurs, the Burst Level is used as the raw error count instead of the actual raw error count. For example, if the Burst Level is 450 and a raw error count of 500 occurs, a value of 450 would typically be used as the raw error count. Users have the option of setting a Maximum Count per Interval greater than the Burst Level. This would allow actual raw error counts up to the Maximum Count per Interval to be used by the integrator. The Maximum Count per Interval would be used instead of the raw error count when the raw error count is greater than the Maximum Count per Interval. For example, if the Burst Level is 450, the Maximum Count per Interval is 500, and a raw error count of 475 occurs, 475 would be used as the error count. If a raw error count of 550 occurs, 500 would be used as the error count. If a Maximum Count per Interval greater than the Burst Level is chosen, users may choose to substitute the Maximum Count per Interval for the Burst Level in the formulas used by the integrator.

The minimum possible value for the accumulator is typically set at zero, but users have the option of setting the Accumulator Minimum at a level below zero. If the Accumulator Minimum is set below zero and a large number of Down Counts occur, the accumulator could fall below zero. If the accumulator is below zero when a number of bursts equal to the Consecutive Burst Limit occurs, the Alarm Level would not be reached. For this reason, an Accumulator Minimum less than zero is typically not desirable. However, if few bursts are expected, a user may choose an Accumulator Minimum that is less than zero.

The maximum possible value for the accumulator is typically set at the Alarm Level but users have the option of setting the Accumulator Maximum at a level greater than the Alarm Level. If the Accumulator Maximum is set at the Alarm Level and the accumulator has reached the Alarm Level, then a raw error count that causes a Down Count will clear the alarm. That is, the accumulator will fall below the Alarm Level. If the Accumulator Maximum is set above the Alarm Level then a single Down Count might not clear an alarm; several Down Counts may be necessary for the accumulator to fall below the Alarm Level. Also, if the Accumulator Maximum is greater than the Alarm Level, a number of consecutive zero raw error counts greater than or equal to the number of Sampling Intervals minus the Consecutive Burst Limit will not necessarily cause the accumulator to reach zero. For example, if the Alarm Level is 1440, the accumulator is also at 1440, the number of Sampling Intervals is 32, the Consecutive Burst Limit is four, and the Maximum Down Count is 51.4, then it is typically desirable that 28 Maximum Down Counts (the number of Sampling Intervals minus the Consecutive Burst Limit) cause the accumulator to reach zero. However, if the accumulator is greater than 1440, 28 Maximum Down Counts would not allow the accumulator to reach zero. If the accumulator does not reach zero, then a smaller than desired number of consecutive bursts or fewer than desired intervals with dribbles could cause an alarm. For these reasons, the Accumulator Maximum is typically set at the Alarm Level.

In another embodiment, the Dribble Level can be multiplied by a scaling factor if a user wishes to fine-tune the behavior of the system. The scaled Dribble Level can then be used in the formulas used by the integrator. The Alarm Level can also be multiplied by a scaling factor if a user wishes and the scaled Alarm Level can be used in the formulas.

In another embodiment, multiple alarm thresholds can be applied to the Alarm Level. For example, when the accumulator reaches 75% of the Alarm Level, a minor alarm can be generated, and a major alarm generated when the Alarm Level is reached.

Figure 2:
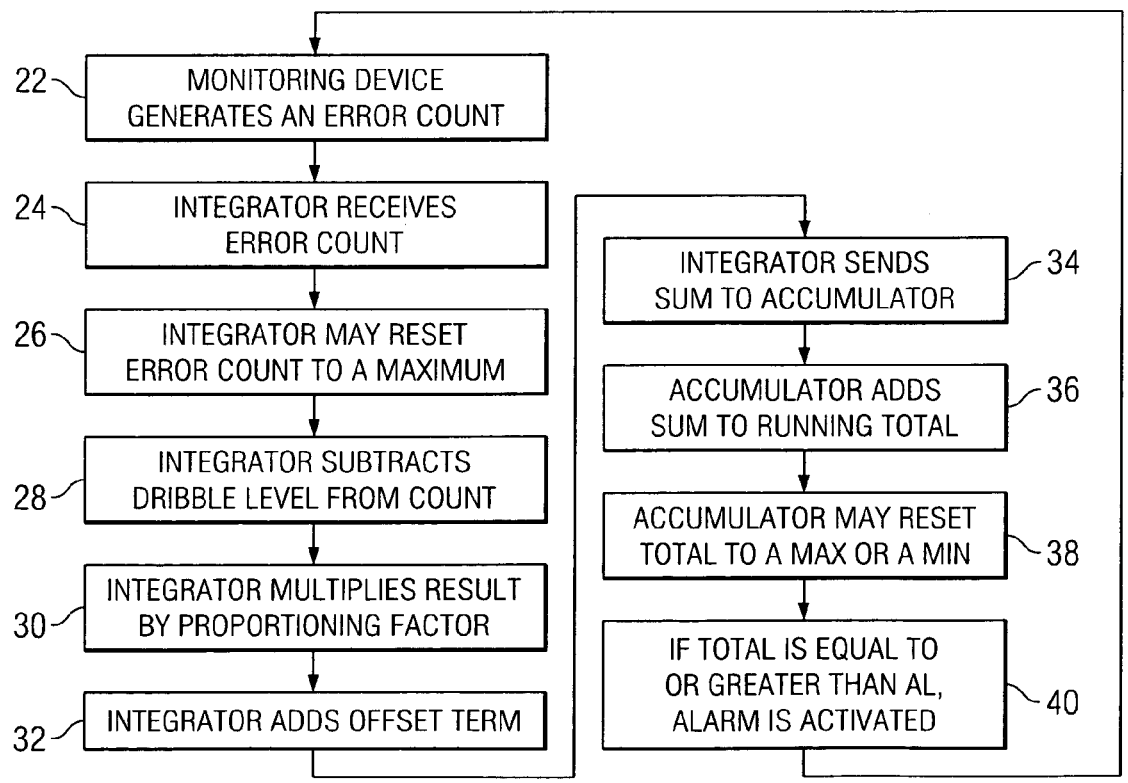
FIG. 2 is a flowchart showing a series of processing steps for an embodiment of the Threshold Crossing Alarm System of the present invention.
Figure 3:
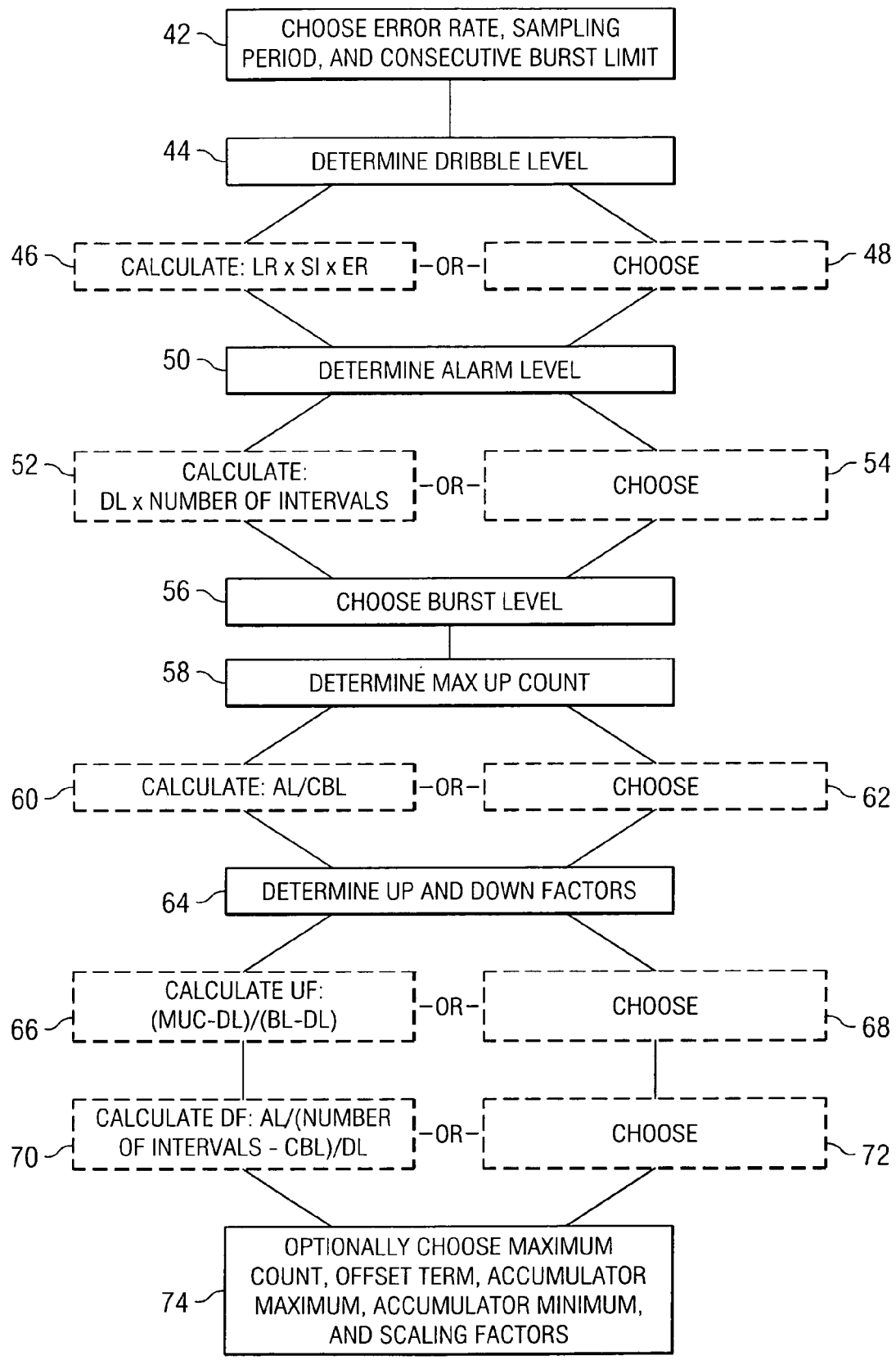
FIG. 3 is a flowchart showing a process for selecting values for the variables used by an embodiment of the Threshold Crossing Alarm System of the present invention.

The functions performed by the Threshold Crossing Alarm System comprise, among others: selecting values for the variables to be used by the integrator and using these values and the raw error counts received from a monitoring device to determine the accumulator total. An embodiment of the process of deriving the accumulator total is depicted in FIG. 2. In box 22, a monitoring device generates a raw error count. The integrator receives the raw error count from the monitoring device in box 24. In box 26, the integrator may reset the raw error count to a user-selected maximum count. The integrator subtracts the Dribble Level from the error count in box 28, multiplies the result by a proportioning factor in box 30, and adds an offset term in box 32. In box 34, the integrator sends the sum obtained in box 32 to the accumulator. The accumulator adds the sum to a running total in box 36. In box 38, the accumulator may reset the total to a user-selected maximum or minimum. In box 40, if the accumulator total is equal to or greater than the Alarm Level, an alarm is activated. This process can continue as long as the Threshold Crossing Alarm System is active and receiving error counts from a monitoring device An embodiment of the process of selecting values for the integrator variables is illustrated in FIG. 3. In box 42, a user of a Threshold Crossing Alarm System chooses an acceptable Error Rate, the Sampling Period to be used by the integrator, and the Consecutive Burst Limit, i.e., the maximum allowable number of consecutive bursts. While the selection of these variables is depicted in FIG. 3 as the first step in the variable selection process, these variables can actually be selected at any point in the process before the point at which they are first used. In box 44, the Dribble Level is determined. This can be done in two ways, shown in boxes 46 and 48. In box 46, the Dribble Level is calculated by multiplying the Line Rate by the length of the Sampling Interval and by the Error Rate. The Line Rate and Sampling Interval are set by the component being monitored by a monitoring device and the Error Rate is chosen by the user as shown in box 42. In box 48, a Dribble Level is chosen based on the user's own formula or needs. In box 50, the Alarm Level is determined. This can be done in two ways, shown in boxes 52 and 54. In box 52, the Alarm Level is calculated by multiplying the Dribble Level by the number of intervals in a Sampling Period. In box 54, an Alarm Level is chosen based on the user's own formula or needs. The user chooses a Burst Level in box 56. In box 58, the Maximum Up Count is determined. This can be done in two ways, shown in boxes 60 and 62. In box 60, the Maximum Up Count is calculated by dividing the Alarm Level by the Consecutive Burst Limit. In box 62, a Maximum Up Count is chosen based on the user's own formula or needs. In box 64, the Up Factor and the Down Factor are determined. Again, the Up and Down Factors can be chosen based on the user's own formula or needs, as shown in boxes 68 and 72, or the Up and Down Factors can be calculated as shown in boxes 66 and 70. In Box 66, the Up Factor is calculated by dividing the difference between the Maximum Up Count and the Dribble Level by the difference between the Burst Level and the Dribble Level. In box 70, the Down Factor is calculated by dividing the Alarm Level by the difference between the number of intervals and Consecutive Burst Limit and then dividing again by the Dribble Level. The calculations of the Up and Down Factors do not necessarily have to be done in the order shown. The calculation of the Down Factor can be done before the calculation of the Up Factor. In box 74, the user has the option of choosing the Maximum Count per Interval that will be used by the integrator, the offset term used by the integrator, the maximum and minimum values the accumulator will be allowed to reach, and the scaling factors by which the Dribble Level and Alarm Level can be multiplied. While the selection of these variables is depicted in FIG. 3 as the last step in the variable selection process, these variables can actually be selected at any point in the process.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for activating an alarm based on a series of raw error counts generated by a monitoring device comprising:
   counting a plurality of errors in a monitoring device, thereby generating the raw error counts;
   receiving the series of raw error counts from the monitoring device;
   adjusting the raw error counts to produce adjusted counts;
   determining a running total of adjusted counts; and
   activating an alarm when the running total exceeds an alarm level;
   wherein the adjusting of raw error counts comprises:
      determining the difference between a raw error count and a dribble level;
      determining the product of the difference and a proportioning factor;
      determining the sum of the product and an offset term; and
      setting the adjusted count equal to the sum.

2. The method of claim 1 wherein the dribble level is calculated by determining the product of:
   the line rate at which a component monitored by the monitoring device transmits data;
   the sampling time in the monitoring device's sampling interval; and
   the minimum error rate considered unacceptable by a user of the method.

3. The method of claim 2 wherein the line rate is in bits per second, the sampling time is in seconds, and the error rate is the proportion of error bits to total bits for a sampling interval.

4. The method of claim 2 wherein the alarm level is calculated by determining the product of the dribble level and the number of sampling intervals in a predetermined sampling period.

5. The method of claim 4 wherein the maximum adjusted count is calculated by dividing the alarm level by a predetermined maximum allowable number of consecutive bursts.

6. The method of claim 4 wherein the maximum adjusted count is chosen by the user.

7. The method of claim 5 wherein the proportioning factor used when the raw error count is equal to or greater than the dribble level is determined by dividing the difference between the maximum adjusted count and the dribble level by the difference between a predetermined bunt level and the dribble level.

8. The method of claim 7 wherein the raw error count greater than the burst level is set equal to the burst level prior to being adjusted to produce an adjusted count.

9. The method of claim 7 wherein the raw error count greater than the burst level is set equal to a user-selected value greater than the burst level prior to being adjusted to produce an adjusted count.

10. The method of claim 5 wherein the proportioning factor used when the raw error count is equal to or greater than the dribble level is chosen by the user.

11. The method of claim 5 wherein the proportioning factor used when the raw error count is less than the dribble level is determined by dividing the alarm level by the difference between the number of sampling intervals in one sampling period and the maximum allowable number of consecutive bursts and dividing the resulting quotient by the dribble level.

12. The method of claim 5 wherein the proportioning factor used when the raw error count is less than the dribble level is chosen by the user.

13. The method of claim 1 wherein the dribble level is chosen by the user.

14. The method of claim 1 wherein the alarm level is chosen by the user.

15. The method of claim 1 wherein the offset term used when the raw error count is equal to or greater than the dribble level equals the dribble level.

16. The method of claim 1 wherein the offset term used when the raw error count is equal to or greater than the dribble level is chosen by the user.

17. The method of claim 1 wherein the offset term used when the raw error count is less than the dribble level equals zero.

18. The method of claim 1 wherein the offset term used when the raw error count is less than the dribble level is chosen by the user.

19. The method of claim 1 wherein the minimum running total is zero.

20. The method of claim 1 wherein the minimum running total is less than zero.

21. The method of claim 1 wherein the maximum running total is the alarm level.

22. The method of claim 1 wherein the maximum running total is greater than the alarm level.

23. The method of claim 1 wherein more than one alarm level exists.

24. The method of claim 1 wherein the alarm level is multiplied by a scaling factor.

25. The method of claim 1 wherein the dribble level is multiplied by a scaling factor.

26. A system for activating an alarm based on a series of raw error counts generated by a monitoring device comprising:
   the monitoring device to count a plurality of errors, thereby generating the raw error counts;
   an integrator to receive the series of raw error counts from the monitoring device and adjust the series of raw error counts to produce adjusted counts;
   an accumulator to receive the adjusted counts from the integrator and add the adjusted counts to a running total; and
   an alarm to be activated when the running total exceeds an alarm level;
   wherein the adjusting of a raw error count comprises:
      determining the difference between a raw error count and a dribble level;
      determining the product of the difference and a proportioning factor;
      determining the sum of the product and an offset term; and
      setting the adjusted count equal to the sum.

27. The system of claim 26 wherein the dribble level is calculated by determining the product of:
   the line rate at which a component monitored by the monitoring device transmits data;
   the sampling time in the monitoring device's sampling interval; and the minimum error rate considered unacceptable by a user of the system.

28. The system of claim 27 wherein the line rate is in bits per second, the sampling time is in seconds, and the error rate is the proportion of error bits to total bits for a sampling interval.

29. The system of claim 27 wherein the alarm level is calculated by determining the product of the dribble level and the number of sampling intervals in a predetermined sampling period.

30. The system of claim 29 wherein the maximum amount by which the accumulator can increase is calculated by dividing the alarm level by a predetermined maximum allowable number of consecutive bursts.

31. The system of claim 29 wherein the maximum amount by which the accumulator can increase is chosen by the user.

32. The system of claim 30 wherein the proportioning factor used when the raw error count is equal to or greater than the dribble level is determined by dividing the difference between the maximum amount by which the accumulator can increase and the dribble level by the difference between a predetermined burst level and the dribble level.

33. The system of claim 32 wherein the raw error count greater than the burst level is set equal to the burst level prior to being adjusted to produce an adjusted count.

34. The system of claim 32 wherein the raw error count greater than the burst level is set equal to a user-selected value greater than the burst level prior to being adjusted to produce an adjusted count.

35. The system of claim 30 wherein the proportioning factor used when the raw error count is equal to or greater than the dribble level is chosen by the user.

36. The system of claim 30 wherein the proportioning factor used when the raw error count is less than the dribble level is determined by dividing the alarm level by the difference between the number of sampling intervals in one sampling period and the maximum allowable number of consecutive bursts and dividing the resulting quotient by the dribble level.

37. The system of claim 30 wherein the proportioning factor used when the raw error count is less than the dribble level is chosen by the user.

38. The system of claim 26 wherein the dribble level is chosen by the user.

39. The system of claim 26 wherein the alarm level is chosen by the user.

40. The system of claim 26 wherein the offset term used when the raw error count is equal to or greater than the dribble level equals the dribble level.

41. The system of claim 26 wherein the offset term used when the raw error count is equal to or greater than the dribble level is chosen by the user.

42. The system of claim 26 wherein the offset term used when the raw error count is less than the dribble level equals zero.

43. The system of claim 26 wherein the offset term used when the raw error count is less than the dribble level is chosen by the user.

44. The system of claim 26 wherein the minimum level the accumulator is allowed to reach is zero.

45. The system of claim 26 wherein the minimum level the accumulator is allowed to reach is less than zero.

46. The system of claim 26 wherein the maximum level the accumulator is allowed to reach is the alarm level.

47. The system of claim 26 wherein the maximum level the accumulator is allowed to reach is greater than the alarm level.

48. The system of claim 26 wherein more than one alarm level exists.

49. The system of claim 26 wherein the alarm level is multiplied by a scaling factor.

50. The system of claim 26 wherein the dribble level is multiplied by a scaling factor.

51. An apparatus for activating an alarm based on a series of raw error counts generated by a monitoring device comprising:
 means for counting a plurality of errors in a monitoring device, thereby generating the raw error counts;
 means for receiving the series of raw error counts from the monitoring device;
 means for adjusting the raw error counts to produce adjusted counts;
 means for determining a running total of adjusted counts; and
 means for activating an alarm when the running total exceeds an alarm level;
 wherein the means for adjusting the raw error counts comprises:
  means for determining the difference between a raw error count and a dribble level;
  means for determining the product of the difference and a proportioning factor;
  means for determining the sum of the product and an offset term; and
  means for setting the adjusted count equal to the sum.

* * * * *